United States Patent [19]

Muir et al.

[11] Patent Number: 4,560,489

[45] Date of Patent: Dec. 24, 1985

[54] HIGH PERFORMANCE CALCIUM BORATE MODIFIED OVERBASED CALCIUM SULFONATE COMPLEX GREASES

[75] Inventors: Ron Muir, West Hill; William Blokhuis, Scarborough, both of Canada

[73] Assignee: Witco Chemical Corporation, New York, N.Y.

[21] Appl. No.: 531,841

[22] Filed: Sep. 14, 1983

[51] Int. Cl.$^4$ .............................................. C10M 1/40
[52] U.S. Cl. ...................................... 252/33.4; 252/18
[58] Field of Search ................................. 252/33.4, 18

[56] References Cited

U.S. PATENT DOCUMENTS

| | | | |
|---|---|---|---|
| 2,978,410 | 4/1961 | Worth | 252/18 |
| 3,057,896 | 10/1962 | Schlicht et al. | 252/18 |
| 3,186,944 | 6/1965 | Dreher | 252/18 |
| 3,242,079 | 3/1966 | McMillen | 252/18 |
| 3,376,222 | 4/1968 | McMillen | 252/18 |
| 3,492,231 | 1/1970 | McMillen | 252/33 |
| 3,537,996 | 11/1970 | Holst et al. | 252/18 |
| 3,679,584 | 7/1972 | Hellmuth | 252/33.4 |
| 3,907,691 | 9/1975 | King et al. | 252/33.4 |
| 3,929,650 | 12/1975 | King et al. | 252/33.4 |
| 3,940,339 | 2/1976 | Clarke et al. | 252/18 |
| 4,376,060 | 3/1983 | Stadler | 252/18 |

*Primary Examiner*—William R. Dixon, Jr.
*Assistant Examiner*—Margaret B. Medley
*Attorney, Agent, or Firm*—Sidney Wallenstein; Harry V. Strampel

[57] ABSTRACT

High performance modified high metal ratio overbased calcium complex greases which contain colloidally dispersed therein calcium carbonate in the form of crystalline calcite, and which greases include minor proportions, by weight, of (a) a calcium borate and (b) a calcium soap of a soap-forming aliphatic monocarboxylic acid containing at least 12 carbon atoms, exemplified by 12-hydroxystearic acid, said (a) and (b) ingredients being essentially homogeneously distributed through said calcium complex grease.

20 Claims, No Drawings

HIGH PERFORMANCE CALCIUM BORATE MODIFIED OVERBASED CALCIUM SULFONATE COMPLEX GREASES

BACKGROUND OF THE INVENTION

1. Field of the Invention

Our present invention is directed to the preparation of high performance calcium borate modified overbased calcium sulfonate complex greases which are characterized by a combination of marked improvements in various properties over properties which have characterized certain types of heretofore known greases. The greases of the present invention are of the thixotropic type which comprise, advantageously, based upon the use of a mineral oil or equivalent oil medium in their production, as essential ingredients, oil-soluble calcium sulfonates derived from oil-soluble higher molecular weight sulfonic acids, which greases also contain calcium carbonate as calcite in extremely finely divided form, and also contain, as essential ingredients, calcium borate, and certain soaps, but they differ significantly and importantly from known prior art greases not only in their overall composition but, also, as indicated above, in various of the properties of such heretofore known greases.

2. Brief Description of the Prior Art

Thixotropic greases or greaselike overbased calcium sulfonate compositions having corrosion-inhibiting properties, and having utility for a variety of uses such as, for instance, in automobile and truck body undercoatings, and for various other purposes, are known to the art and are disclosed in various publications and patents, illustrative of which are U.S. Pat. Nos. 3,242,079; 3,372,115; 3,376,222; 3,377,283; 3,523,898; 3,661,622; 3,671,012; 3,746,643; 3,730,895; 3,816,310; and 3,492,231. Such greases or grease-like compositions have gone into quite widespread use either as such, or admixed with other ingredients to produce compositions for use in a variety of environments, and, generally speaking, they are characterized by reasonably good E. P. and antiwear properties, high dropping points, reasonably good resistance to mechanical breakdown, salt spray and water-corrosion resistance, thermal stability at high temperatures, and other desirable properties, as described in the aforesaid patents. Such heretofore known greases or grease-like compositions can be prepared by what is known as a 2-step process, as more particularly shown in the aforesaid U.S. Pat. Nos. 3,242,079, 3,372,115 and 3,492,231; or by what is known as a 1-step process, as is shown, for instance, in the aforementioned U.S. Pat. Nos. 3,671,012 and 3,746,643 which also disclose heretofore known 2-step processes.

U.S. Pat. No. 3,730,895 discloses grease thickeners and greases generally of the foregoing types wherein emphasis is placed on the necessity of utilizing, in the preparation thereof, a cloudy type of overbased calcium sulfonate in an oil carrier, the use of alkali or alkaline earth metal soaps of hydroxy fatty acids having about 12 to about 24 carbon atoms, and, in addition, also as a critical or essential ingredient thereof, a water-soluble corrosion inhibitor, illustrative examples of which latter are alkali metal and ammonium nitrites, carbonates, bicarbonates, sulfites, borates, chlorates, and perchlorates, as well as numerous other water-soluble corrosion inhibitors.

U.S. Pat. No. 3,492,231 discloses large numbers of overbased materials in the form of metal-containing single phase Newtonian solutions, for example, overbased calcium sulfonates, which it utilizes as intermediate materials for converting such solutions, by the addition thereto of so-called converting agents, to effect conversion of such solutions into the non-Newtonian thixotropic colloidal disperse systems to which the invention and the claims of said patent are directed. Among the metal-containing single phase Newtonian solutions disclosed in said patent, as generally noted above, are overbased calcium salts of sulfonic acids containing at least about 12 aliphatic carbon atoms exemplified by dodecylbenzene sulfonic acid, $C_{12}$–$C_{40}$ mixed alkylbenzene sulfonic acids, dinonylbenzene sulfonic acid, and numerous other sulfonic acids as disclosed in said patent and in others of the above-disclosed patents and numerous other U.S. and foreign patents. These overbased single phase Newtonian solutions, according to U.S. Pat. No. 3,492,231, may have metal ratios as low as 1.1, although it also, and largely, discloses such solutions having materially higher metal ratios. While various processes are disclosed in said U.S. Pat. No. 3,492,231, and in numerous other patents and other printed publications, for preparing said overbased metal-or calcium-containing single phase Newtonian solutions, it is common practice to make them, as disclosed in said U.S. Pat. No. 3,492,231, by initially preparing a mixture or solution of a calcium sulfonate having a low metal ratio, e.g., 2 or 2.5, dissolved in a nonpolar organic solvent, commonly a mineral oil; a metal base, for instance, calcium hydroxide; a so-called promoter, which permits the incorporation of excess metal, in this case, calcium, into the overbased Newtonian solutions; and carbon dioxide.

U.S. Pat. No. 3,492,231 discloses large numbers of diversified types of converting agents which, upon addition to the overbased Newtonian solutions of calcium sulfonates or other overbased metal-containing materials, usually coupled with heating and/or vigorous mixing, bring about the formation of the non-Newtonian colloidal disperse systems comprising the invention of said patent. These include, among many others, water; alcohols, for instance, methanol, isobutanol, n-pentanol and many others or mixtures thereof or mixtures of alcohols with water; alkylene glycols; mono-lower alkyl ethers of alkylene glycols such as monomethylether of ethylene glycol (methyl Cellosolve); and numerous others such as lower aliphatic carboxylic acids exemplified by acetic acid and propionic acid; ketones; aldehydes; amines; phosphorus acids; alkyl and aromatic amines; certain imidazolines; alkanolamines; boron acids, including boric acid; tetraboric acid; metaboric acid; and esters of such boron acids; and, also, carbon dioxide as such, or better in combination with water. The resulting non-Newtonian colloidal disperse systems of said patent may be in the form of gels or greases depending upon the particular conditions, proportions and ingredients which are utilized in the preparation thereof.

U.S. Pat. No. 3,492,231 also points out that, in those overbased Newtonian solutions in which the overbased materials are calcium sulfonates, the calcium carbonate which is formed during the preparation of said Newtonian solutions appears to be in amorphous form whereas, when said Newtonian solutions are converted into the non-Newtonian colloidal disperse systems, the dissolved amorphous calcium carbonate salt or complex is transformed into solid crystalline metal-containing particles of calcium carbonate, usually in the form of calcite, which then grow to form particle sizes which may range in size from about 40 to 50 Angstroms (A.) or larger, for instance, up to 1000 A. or even up to about 5000 A.[1]

[1]. Under certain conditions, and in certain cases only, in the conversion step, the solid calcium carbonate which forms is not solely calcite but contains some vaterite. This does not appear to adversely affect the production of the greases of our invention.

It has also long been known to the art, as shown in U.S. Pat. No. 2,607,735, to prepare substantially anhydrous calcium soap greases which consist essentially of a lubricating oil containing, as a thickener, from 5 to 30% by weight of a calcium soap of a mono-and/or di-hydroxy substantially saturated fatty acid containing from 12 to 24 carbon atoms and exemplified by the calcium salt of 12-hydroxystearic acid. This patent points out that the calcium salts of the aforesaid hydroxy fatty acids have improved properties over the calcium salts of non-hydroxy $C_{12}$ to $C_{24}$ fatty acids in that the calcium salts of the hydroxy $C_{12}$ to $C_{24}$ fatty acids have much greater high temperature properties than the calcium soaps of the corresponding non-hydroxy $C_{12}$ to $C_{24}$ fatty acids, and, further, that very substantial improvement results from the inclusion in the calcium soap greases of the invention of said patent of from about 1 to 10 wt. % of low molecular weight salts such as calcium acetate and calcium propionate. This patent states, further, that salts of certain inorganic compounds, for example, those of boric acid and its derivatives, may also be incorporated into the calcium soap greases of the invention. It notes that a conventional lime soap grease becomes unstable at temperatures around the boiling point of water, for example above 200° F.; whereas, when the $C_{12}$ to $C_{24}$ hydroxy fatty acid calcium salts or soaps are substituted for the corresponding calcium salts or soaps of the $C_{12}$ to $C_{24}$ non-hydroxy fatty acids, the melting point and the useful range of lime soap greases may be raised about 70° F. to 100° F. or more. The addition, further, to said greases made from the aforesaid calcium salts or soaps of the hydroxy fatty acids, of the lower molecular weight salts such as calcium acetate and calcium propionate, is stated to raise the high temperature range by as much as an additional 200° F. or so. The patent points out, additionally, that the inclusion in the calcium soap greases of the calcium acetate raises the dropping point of the greases very materially, whereas others, such as boric acid, do not so materially raise the melting point but appear, nevertheless, to be valuable ingredients in further stabilizing the greases at higher operating temperatures. In Example V of the patent, a grease made in accordance with the patent is disclosed in which calcium borate is used (formed upon neutralization of the boric acid with calcium hydroxide) which is stated to be of particular interest because of the low cost of boric acid and because, under conditions where extremely high temperature is not encountered, the calcium soap borate greases of the patent have very satisfactory properties. This Example V grease exhibited about a 10% oil loss, characterized as a somewhat high loss, at 225° F., and it lost viscosity rapidly at higher temperatures. The patent states that, nevertheless, the grease of Example V appears to be quite satisfactory for lubrication at temperatures up to about 250° F., and that spindle tests at 250° F. and at 10,000 R.P.M. showed a useful life of 1000 hours which is asserted to be remarkable for a lime base grease.

That the greases of U.S. Pat. No. 2,607,735 are radically distinguished from those of our present invention is apparent, apart from other aspects or considerations, from the following facts. Whereas said patent, in Column 5, Lines 18-24, emphasizes "that a grease stable at temperatures above 225° F. apparently can not be prepared from ordinary calcium stearate and the corresponding borate" whereas, on the other hand, "The soaps of hydroxy acids * * * seem to combine very well with the salts of boric acid to form a grease stable at reasonably high temperatures, i.e. temperatures ranging around 225° to 250° F." In sharp contrast thereto, the greases of our present invention can use, as the soap content thereof, conventional soap-forming acids, e.g. stearic acid or oleic acid, and there are obtained greases which have excellent high temperature stability as measured by the dropping point as demonstrated by the following data:

| Soap-Forming Acid | Grease Penetration | Dropping Point |
|---|---|---|
| Stearic Acid | 315 | 500° F. |
| Oleic Acid | 332 | 500° F. |
| 12-Hydroxy-stearic Acid | 295 | 500° F. |

Furthermore, infra-red scans of greases made in accordance with our present invention differ radically from those greases made in accordance with the invention of U.S. Pat. No. 2,607,735, indicating that the greases of our invention and the greases of the invention of said patent clearly differ from each other compositionally, structurally and in various of their properties and utilities.

In short, the grease compositions of U.S. Pat. No. 2,607,735 are not of the type to which our present invention relates, namely, thixotropic overbased calcium sulfonate greases; they are inferior in numbers of respects to the greases of our invention and they do not possess many of the advantageous properties which characterize the greases of our invention.

None of the foregoing patents, or any other patents or printed publications dealing with the preparation of greases or grease compositions, of which there are very large numbers, discloses or suggests, so far as we are aware, the novel grease compositions of our present invention or the preparation thereof, nor, of course, the improved results which are obtained by the grease compositions of our invention, which we disclose and describe below.

Prior art greases or grease compositions, such as, for instance, those disclosed in U.S. Pat. Nos. 3,242,079; 3,372,115; and 3,376,222, which embody therein calcium or other alkaline earth metal sulfonates and extremely finely divided solid particles of calcium carbonate, generally in the form of calcite, with due regard for various of their favorable properties, also, generally speaking, suffer certain significant and material disadvantages. For instance, they possess inherently poor pumpability, being essentially unpumpable at low temperatures or room temperatures, as well as somewhat above room temperature, due to their extremely tacky consistency, thereby reducing relatively low temperature applicability. This, in itself, is a very substantial deficiency because it complicates the ability to handle such greases and limits their utility for a number of uses which they might otherwise be able to fulfill. Still another of their disadvantages, viewed from an economic standpoint, is due to the large amount of calcium sulfonates required to provide a fully satisfactory grease consistency since such greases are, generally speaking, expensive to produce, which limits their commercial value because greases are, in the main, low cost items and anything which results in appreciably increasing the cost of greases presents an important disadvantage in limiting the extent and field of use thereof. These, and other, disadvantages of such known greases and grease compositions are overcome by the novel greases and grease compositions of our present invention, since, in the first place, the pumping characteristics of the greases of our invention are comparable to those of known types of greases where there is no such problem. Additionally, greases and grease compositions made in accordance with our invention, at least in many or most cases, perform at least equally well and, in many cases, decidedly better compared with heretofore known commercial high performance multipurpose greases, a situation which is not the case with the strictly calcium sulfonate greases of the type disclosed in the illustrative aforementioned patents. The greases of our invention are characterized by high dropping points and by other advantageous multipurpose properties, thereby adapting them for a wide variety of uses in different environments.

SUMMARY OF THE PRESENT INVENTION

In accordance with our present invention, the improved high performance multipurpose greases are prepared from non-Newtonian overbased calcium sulfonate oleaginous solutions, particularly mineral oil, containing extremely finely divided or colloidally dispersed solid crystalline particles of calcium carbonate which are essentially in the form of calcite, to which there is added, advantageously formed in situ, distinctly minor proportions of calcium borate or a calcium borate complex; and, also, to which there are added or incorporated, also in minor proportions, calcium soaps of soap-forming aliphatic monocarboxylic acids, which advantageously are hydroxy-fatty acids containing at least about 12 and, more desirably, 16 to 18, carbon atoms, said soap or soaps also most advantageously being formed in situ. In broad terms, so far as the process or processes utilized to produce the novel greases and grease compositions of our present invention are concerned, a relatively highly overbased, for instance having a metal ratio of about 6 to about 25 or 30, particularly having a metal ratio of about 18 to about 22, solution of a calcium sulfonate or sulfonates, say, in a mineral oil, produced in accordance with any of many known processes, such as are, for instance, disclosed in U.S. Pat. Nos. 3,429,811 and 4,165,291; and other aforementioned U.S. Pat. Nos. 3,242,079; 3,372,115; 3,376,222; 3,492,231 and Canadian Pat. No. 593,056 (the disclosures of which patents in relation to the foregoing being incorporated herein by reference), but modified with sufficient excess calcium oxide or hydrated calcium oxide or calcium hydroxide to produce the aforementioned high metal ratios, is admixed with a preformed calcium borate, made by reacting boric acid in hot water, or a water solution of boric acid, or with a mixture of boric acid with hot water in certain proportions by weight to each other, and with a calcium salt, for instance, calcium hydroxide. In lieu of so proceeding, the calcium borate may be formed in situ in said overbased calcium sulfonate solutions by adding boric acid and water, preferably hot water, and a calcium compound, for instance, calcium hydroxide, to said calcium carbonate solution and effecting the formation, under conditions of agitation, of calcium borate or a calcium borate complex in said solution. The calcium soap (or soaps) is incorporated into or formed in situ in said solution. In the reaction mass, the soap (or soaps) appears to be in the form of or part of an overall complex system, the exact nature of which has not been determined. The final high performance multipurpose calcium complex thixotropic grease or grease composition may, in one sense, be defined broadly as a product formed by a combination of (1) a highly overbased calcium sulfonate of a high molecular weight oil-soluble sulfonic acid, dissolved in an oil, particularly a mineral oil, containing extremely finely divided (at least mainly in excess of about 20 A, and, more particularly, in various particle sizes in the range of about 50 or about 70 up to about 1000 A. or even up to about 5,000 A.) calcium carbonate mainly or essentially in the form of calcite; (2) a product formed by the reaction of boric acid with a calcium compound such as, e.g., calcium hydroxide or calcium carbonate (as calcite), presumably calcium borate or calcium borate intermingled or in some kind of complex in the grease or grease composition as a whole; and (3) a product formed from calcium hydroxide/calcium carbonate (as calcite) and a soap-forming aliphatic monocarboxylic or fatty acid, particularly a soap-forming hydroxy-fatty acid, such as 12-hydroxystearic acid, the overall composition of the (1), (2) and (3) products apparently or possibly being in some form of complex system, undetermined as noted above. The composition (1) referred to above appears to exert and be responsible for imparting high-temperature stabilizing properties to the overall composition. While calcium soaps, derived from soap-forming fatty acids, including soap-forming, generally $C_{12}$ to $C_{24}$, hydroxy-fatty acids such as 12-hydroxystearic acid, have heretofore been utilized in the production of greases to provide thickening properties in a mineral oil or other oil environment, as noted, for instance, in the above-cited U.S. Pat. No. 2,607,735, they have not, to the best of our knowledge and belief, been utilized in greases or grease compositions such as those of our present invention in which latter case the overall properties of the greases or grease compositions are not attainable in the greases or grease compositions of the prior art which have heretofore used or disclosed for use said calcium soaps of soap-forming fatty acids. Composition (3), particularly when formed in situ, serves, among other purposes, in the greases or grease compositions of our present invention, to produce greases with significantly reduced tackiness, improved low temperature pumpability, and substantially increased improved grease yields.

In connection with the matter of the interrelationship of the (1), (2) and (3) compositional parts of the overall grease compositions of our present invention, it may be noted that if any of the aforesaid (1), (2) or (3) compositions is eliminated or included in proportions outside a reasonable range, hereafter illustratively noted, the greases or grease compositions and their overall advantageous combination of properties and utilities of our present invention are not obtained. Thus, for instance, if composition (3) is excluded or omitted, a grease consistency is not formed and a product which more resembles a viscous oil results. If the (1) composition is excluded or omitted, once again a fluid oil-like material results which does not resemble a grease. Finally, if the (2) composition is excluded or omitted, while a grease product does form, it has been found, for instance, to be so severely diminished in high temperature performance properties as to greatly restrict the usefulness of the grease or grease compositions of the present invention so that the multifunctional properties thereof are very substantially lessened, thereby failing to satisfy the full requirements and purposes of the greases and grease compositions of our present invention.

As will be indicated below, the ranges of the proportions of the (1), (2) and (3) compositions are variable but it is essential that they fall within such ranges as to produce a grease having both the desired physical and functional properties of the greases to the preparation of which our present invention is directed. It follows from what has been stated above that all three of said (1), (2) and (3) products must be present since, otherwise, the desired greases of our present invention are not obtained.

It may also, here, be noted that, while acetic acid or propionic acid, as is also true of boric acid, have the property of thickening or converting overbased Newtonian calcium sulfonate solutions to non-Newtonian colloidal disperse systems, as shown in the aforementioned U.S. Pat. No. 3,492,231, the acetic acid and propionic acid are not effective to achieve the results obtained by the use of boric acid when used under the conditions and in the greases or grease compositions of our present invention, in the form of calcium salts thereof. We are, at present, unaware of any other materials which achieve the results that are obtained by the use of boric acid or a boric acid (preformed or formed in situ as calcium salts or complexes) when used for the production of the greases of our present invention or when used in the greases or grease compositions and in the manner of production of the greases which are disclosed by us.

DETAILED DESCRIPTION OF THE INVENTION INCLUDING PREFERRED EMBODIMENTS THEREOF

As has been indicated above, the high performance calcium borate modified overbased calcium complex greases of our invention comprise compositions which include minor proportions, by weight, of (a) a calcium borate and (b) a calcium soap of a soap-forming aliphatic monocarboxylic acid containing at least 12 carbon atoms, said (a) and (b) ingredients being essentially homogeneously distributed through said complex grease, and in which the preferred embodiments utilize as the calcium soap the calcium soaps of hydroxy $C_{12}$–$C_{24}$ fatty acids, particularly 12-hydroxystearic acid, and in which both the (a) and the (b) ingredients are particularly advantageously formed in situ in said greases.

The overbased calcium sulfonate content (e.g., the product designated hereafter as C-400) of said greases, as produced by the processes for their production which have been broadly described above and which will be shown by the illustrative particular Examples which are set out below, will generally fall within the weight range of about 30 to about 55%, with a particularly preferred range of about 40 to about 45%. The non-volatile oil, particularly a mineral or lubricating oil, content of the greases will generally fall within the range of about 50 to about 78%, with a particularly preferred range of about 60 to about 68%, said proportions of said non-volatile oil constituting the total oil, that is, the added non-volatile oil plus that present in the calcium sulfonate composition. The boron acid or boric acid component, in the greases of our invention, generally will fall within the range of about 0.6 to about 3.5%, with a particularly preferred range of about 1.2 to about 3%. The content of the soap-forming aliphatic monocarboxylic acid, such as 12-hydroxystearic acid, used in the production of the calcium soap or soaps of the soap-forming aliphatic monocarboxylic acids or hydroxy-fatty acids containing at least 12 and up to about 24 carbon atoms, desirably $C_{12}$ to $C_{18}$ hydroxy-fatty acids, such as commercial hydroxystearic acid, will generally fall within the range of about 1 to about 6%, with a particularly preferred range of about 1.3 to about 5%. The added lime or calcium hydroxide, to form the calcium borate and the calcium soaps of the soap-forming aliphatic monocarboxylic acids, is, by weight of the greases, in the range of about 0.5% to about 5%. However, in certain cases, in the preparation of the overbased calcium sulfonate compositions or solutions, as, for instance, in the preparation of the C-400, referred to and described below, there is commonly present in said compositions or solutions, after the carbonation step, free dispersed lime or calcium hydroxide in an amount of the order of about 1% to about 1.5%, which may render it unnecessary to add any additional calcium oxide or hydrated lime to form the calcium borate and the calcium soaps of the soap-forming aliphatic monocarboxylic acids, in which event the range of the lime or calcium hydroxide is, by weight of the greases, from 0% to about 5%. The content of calcium borate in the grease compositions of the present invention will generally be in the range of about 1.1% to about 6.7%; and that of the calcium soaps of the aliphatic monocarboxylic or fatty acids in the range of about 1.1% to about 6.5%. The relationship of the proportions of the boric acid, the lime or calcium hydroxide and the soap-forming aliphatic monocarboxylic acids utilized in the production of the greases of our present invention play a definite role in the production of optimum quality or effective greases, as will be illustrated hereafter. All of the foregoing percentages are in terms of wt. %, based on the weight of the greases as they are produced in accordance with the process or processes of our invention.

Various supplemental ingredients may, and commonly are, incorporated into the greases of our invention, in very distinctly minor proportions but they are not essential to our invention and no patentable novelty is claimed in their use in those instances where they are included in our greases. Illustrative of such supplemental ingredients are oxidation inhibitors such as phenyl alpha naphthylamine (PAN); viscosity improvers, which may comprise certain polymers (Acryloid 155-C); and others for particular and generally known properties in greases or grease compositions.

As we have indicated above, a starting material may be an overbased calcium sulfonate solution in an oil, particularly mineral or lubricating mineral oil, containing the exceedingly small solid particles of calcite, namely, the non-Newtonian solutions referred to above, are well-known to the art and, as noted above, can be made by the procedures described in various of the patents which have been mentioned in the earlier part of this specification, such as U.S. Pat. Nos. 3,242,079; 3,372,115; 3,492,231; 3,671,012; and 3,746,643. We find it satisfactory to utilize, for starting, overbased calcium sulfonate non-Newtonian solutions. We prefer, however, to start with Newtonian solutions, such as are described below and, for convenience, given the designation C-400. All temperatures referred to in the preparation of C-400, and in the following illustrative Examples for the preparation of exemplary greases in accordance with our invention are in °F.

| | Preparation of C-400 | | |
|---|---|---|---|
| | Gals. | Lbs. | |
| 1. A.V.M. & P. Naphtha (Dist. Range 240–280°) | 650 | | |
| 2. Neutral Calcium Sulfonate | 475 | 4500 | Breakdown Neutral Calcium Sulfonate - 1850 Lbs. Lubricating Mineral Oil - 3800 Lbs. |
| 3. Lubricating Mineral Oil | 130 | 1100 | |
| 4. Hydrated Lime (Chemical Grade 96–98% Pure) | | 4000 | |
| 5. Methanol | 100 | 800 | |
| 6. Carbon Dioxide Gas | | 1500 | |

The foregoing ingredients are charged to a 2000-gallon stainless steel reactor equipped with an agitator; external jackets for steam heating and water cooling; a reflux condenser and a charger for introducing $CO_2$ gas in the order indicated. Ingredients Nos. 1, 2 and 3 are metered. Ingredient No. 4 is charged by weight from a bulk lime storage system and conveyed pneumatically into the reactor. Ingredient No. 5 is metered, after which the mixture of ingredients in the reactor is raised to a temperature of about 140°.

The carbon dioxide gas is then introduced into the body of the ingredient mixture in the reactor at a controlled rate using a conventional flow meter and a timer whereby, when the above-stated amount of $CO_2$ has been introduced, the introduction of $CO_2$ is stopped by activation of a $CO_2$ shutoff valve. The reaction between the $CO_2$ and the mixture of ingredients is exothermic and the reactor temperature is controlled between 140°–160° by cooling water on jackets and on reflux condenser. The $CO_2$ reaction generally requires approximately 2 hours. When the reaction is complete, cooling is continued until the temperature reaches about 100°, at which point the contents of the reactor are transferred to a filter feedtank for solids removal. After filtering, the volatile solvent is stripped in conventional manner.

The following data characterize an illustrative C-400 overbased calcium sulfonate composition made in accordance with the foregoing described procedure.

| | |
|---|---|
| Total Calcium, wt. % | 15.2 |
| Calcium Sulfonate, wt. % | 18 |
| Alkalinity value (TBN) | 400 |
| Molecular weight | 1020 |
| Specific Gravity @ 60° F. | 1.200 |
| Flash Point C.O.C. ° F. | 370 |
| Viscosity SUS @ 210° F. | 300 |
| Color ASTM Dilute | 7 |
| Water, wt. % | 0.3 to 0.5 |
| Appearance | Bright |
| $CaCO_3$—(CALC), wt. % | 35 |
| Metal Ratio | 20 |

The calcium sulfonate portion of the overbased C-400 is produced from a blend of a synthetic alkylate, desirably a $C_{12}$ to $C_{40}$ mono-alkylbenzene, and lubricating oil feedstocks of conventional character which are commonly used in producing such overbased neutral calcium sulfonates. The lubricating oils are, generally speaking, obtained by well-known refining procedures from mineral oils or can be derived from mineral oils. The mineral oils can be of natural or synthetic character. While the proportions of neutral calcium sulfonates in the mineral oil can be variable, in the above Example, the proportion is approximately 42%. A semi-crude, unfiltered mineral oil composition containing about 10 to 20% naphtha and varying proportions of mineral oil and neutral calcium sulfonate is readily usable as a charge stock. For this reason, in the aforesaid Example, the charge is shown calculated in pounds of neutral calcium sulfonate and lubricating mineral oil. An illustrative or typical reactor charge, of the best embodiment of our invention so far as we are presently aware, would involve utilizing a ratio of approximately 1850 lbs. of neutral calcium sulfonate and about 3800 lbs. of a lubricating oil, advantageously a mineral oil. However, the ratio of these ingredients can vary appreciably, depending upon a variety of considerations, while still obtaining improved greases in accordance with our present invention.

A significant percent of the total lubricating oil is contained in the neutral calcium sulfonate charge stock and it is selected on the basis of type and quality of sulfonate it yields. Any additional mineral oil called for in any particular formulation can be selected on price and convenience considerations; such quality is not critical and a variety of lubricating mineral oils can be used in the process.

In regard to the hydrated lime, a chemical grade of hydrated lime is preferred, 96–98% pure and low in impurities. Particle size and activity play a role in the exact properties of the finished greases. Small particle size increases reactivity, but finer particle sizes add to filtration problems and considering the large excess of lime that has to be removed by filtration (commonly of the order of approximately 60%), this is a cost consideration matter, but the desirable properties of the greases are not affected by such matters.

In the above Example for the preparation of the C-400 overbased calcium sulfonate composition, a molar ratio of 0.55–0.6 $CO_2/Ca(OH)_2$ produces an excellent starting material for the production of the greases of our invention.

The sulfonic acids utilized in the production of the calcium sulfonates are oil-soluble and are produced by sulfonating a feedstock which is most commonly a linear or branched chain mono-alkyl benzene or a mixture of mono-and di-alkyl benzenes in which the alkyl radical contains largely from 12 to 40 carbon atoms, generally mixtures of such alkyl radicals. The sulfonic acids are generally produced in solution in a volatile inert organic solvent such as Varsol or naphtha or mineral spirits and are conventionally converted to calcium sulfonates by reaction with calcium hydroxide. The alkylbenzenes which are particularly desirably utilized for the production of the sulfonic acids thereof are articles of commerce and are sold under such designations as LMR(5)(6), a byproduct alkylbenzene (Conoco, Inc.); NAB-1 (Conoco, Inc.); A390 (Witco Chemical Corporation); and Pal-2 (Esso, France). Other alkylbenzene sulfonic acids are also articles of commerce, illustrative thereof being a linear alkylbenzene sulfonic acid sold under the designation CEDEPON 100. In the practice of our present invention, as indicated above, it is particularly advantageous to utilize primarily mono-alkyl benzene sulfonic acids containing from 12 to 40 carbon atoms or mixtures containing primarily 12 to 40 carbon atoms as the alkyl radical(s). However, in the broader facets of this aspect of our invention, generally equivalent oil-soluble sulfonic acids can be used, such as are shown, for instance, in U.S. Pat. Nos. 3,242,079; 3,671,012; and others of the patents referred to above.

It may again be pointed out that the novel greases and grease compositions of the present invention can be made by using what may be characterized as a 2-step procedure or by what may be characterized as a 1-step procedure. Such 2-step and 1-step procedures are known to the art, not for producing the greases or grease compositions of our present invention, but for producing greases or grease compositions of the prior art as shown, for instance, in the above-mentioned U.S. Pat. No. 3,746,643. Translating the 2-step and the 1-step procedures into terms pertaining to the production of the novel greases and grease compositions of our present invention, the 2-step process would involve, for instance, starting with a Newtonian highly overbased calcium sulfonate solution, such is first converted to a thickened intermediate product by initial treatment thereof with a converting agent, as noted above. Then, there is subsequently added thereto, at elevated temperatures, a boric acid admixed with or dissolved or partially dissolved in hot water, lime or calcium hydroxide, and the soap-forming aliphatic monocarboxylic or fatty acid, such as a $C_{12}$–$C_{24}$ hydroxy fatty acid, whereby to convert the boric acid to calcium borate and to convert the aforesaid soap-forming acid or acids to calcium soaps, with or without supplemental ingredients which are optional and do not form any part of what represents the essentials of our invention. In a 1-step procedure for producing the grease compositions of our invention, there would be involved, for instance, broadly stated, preparing a single mixture of a highly overbased non-Newtonian calcium sulfonate solution in a mineral oil or the like (by procedures to be disclosed below) as in EXAMPLE IV, then charging to this lime or calcium hydroxide, and a boron acid or boric acid solution, the soap-forming aliphatic monocarboxylic or fatty acid, with or without supplemental ingredients, and thoroughly agitating the mixture. It will be understood that, in the 1-step procedure for producing the grease compositions of the present invention, for instance, where a mineral oil or like solution of a sulfonic acid or of a neutral calcium sulfonate is overbased and converted in essentially 1-step to produce a non-Newtonian overbased calcium sulfonate solution, which is further reacted with lime, boric acid and higher molecular weight monocarboxylic or fatty acid, e.g., 12-hydroxy stearic acid, there is no isolation of a Newtonian overbased solution.

The following numbered Examples are exemplary of the production of illustrative greases and grease compositions of our present invention. It will be understood that the present invention is not limited to the specific conditions and details shown in said Examples since various changes will readily occur to those skilled in the art in light of the principles and disclosures provided in the specification and the guiding principles taught hereinabove. All parts stated are in parts by weight and, as indicated previously, all temperatures recited are in °F.

EXAMPLE I

Into a reactor equipped to heat to 300° is charged 41.7 parts C-400, prepared as described above, followed by 10.3 parts bright stock mineral oil. Heat is applied to the jacket and when the temperature reaches 150°–160° the steam is shut off. Next, under conditions of mixing, 4.2 parts water are added, followed by 1.66 parts detergent sulfonic acid (a predominately $C_{12}$ monoalkyl benzene sulfonic acid). When the temperature reaches 190°, 0.5 parts acetic acid is added, followed by 1.6 parts methyl cellosolve.

Mixing is continued and the batch is held between 190°–205° under reflux. During the next 1 hour the product converts to a thickened sulfonate. Due to the high viscosity during this stage, a further 2.63 parts of bright stock oil is charged. When conversion is completed, as observed via the appearance of calcite peaks on the IR at 880 and 705 cm$^{-1}$, 21.5 parts MCT 30 oil (a refined lubricating oil, 60 SUS ≃ 212°, Imperial Oil, Sarnia, Ontario) is added. 1.79 parts hydrated lime is next added in a slurry of 4.2 parts tap water at a kettle temperature of 190°. This is followed by the addition of a solution of 2.6 parts boric acid dissolved in or admixed with 5.8 parts of hot water. Heat is then carefully applied and the batch taken to 280° for about 1 hour to effect dehydration of the initially thickened sulfonate composition.

Then, 3.3 parts 12-hydroxystearic acid is added. After 1 hour at this temperature, 2.6 parts of black oil are added for coloring purposes and the batch is cooled to below 200° whereupon 0.5 parts phenyl alpha naphthalene (PAN) and 0.6 parts Acryloid 155-C is charged. The final product penetration is achieved by charging 10.3 parts MCT 30 oil and then milling the resulting grease to yield a grade II, non-tacky, complex grease. Generally speaking, the greases prepared in accordance with our invention are desirably milled prior to being drummed for shipment.

In the foregoing EXAMPLE I, the amount of water used, in dissolving the boric acid, represents an essentially optimum proportion. If appreciably less water is added at this stage, the grease tends to develop a somewhat grainy texture which may not disappear even after milling through a colloid mill. Hence, for optimum results, the foregoing amount of water in the above EXAMPLE I is desirably used. The proportions of water can, however, be varied if graininess or slight graininess is not regarded as being of significant materiality. For best results, for each part by weight of boric acid used, about 2.25 parts by weight of hot water should be used.

It may also be pointed out that the proportions or the level of content of the overbased Newtonian calcium sulfonate solution utilized (that is, the C-400) used in said EXAMPLE I, plays a role in the physical character of the grease obtained after the completion of the process. Thus, by way of illustration, if the content of the C-400, or other overbased Newtonian calcium sulfonate solution used in the production of the finished grease, is in the range of about 38% or less, a relatively soft grease is obtained which, generally, is not optimum. Again, generally speaking, to obtain a highly optimum finished grease in the process of EXAMPLE I, the C-400 content should be increased to about 41–45% whereby a distinctly firmer grease is obtained, and this can readily be achieved, for instance, in said EXAMPLE I, by deleting the amount of trim oil used in the process. For optimum greases produced in accordance with our invention, there is an optimum percentage of the C-400 or other overbased Newtonian calcium sulfonate starting material during the step when conversion of the calcium carbonate from its initial amorphous state to crystalline calcite takes place, and this also influences final grease yield as measured by product penetration. Also, to the extent that conversion of the amorphous calcium carbonate to crystalline calcite is incomplete or appreciably incomplete, the effect is to produce soft greases which, in general, are not optimal since it also results in somewhat of a reduction in the particularly optimal high temperature properties of the grease. Advantageously, conversion of the amorphous calcium carbonate to crystalline calcite should be complete or reasonably complete, which may be monitored via Infra Red. Generally speaking, also, maximum yield is obtained when the C-400 or other starting overbased Newtonian calcium sulfonate solution content is adjusted to between 70 and 80% of non-volatiles (NV) during conversion. Once converted, the remainder of the desired amount of the required mineral oil or equivalent oil solution is charged and the product further processed as usual. The following TABLE I shows the results from tests on three plant batch runs where the C-400 content is varied during conversion.

TABLE I

Effect of % C-400 vs. Penetration
Data generated from several plant batches Production Run

| % C-400 | "as is" Penetration* (taken from recycle line) | Finished Step I Pen + |
|---|---|---|
| 67% | 265 | 293 |
| 73% | 226 | 266 |
| 77% | 209 | 249 |

*"As is" Pen - sample taken directly from kettle recycle line.
+ Finished Step 1 - sample dehydrated in laboratory and evaluated through Step 1 only.

It may, further, be pointed out that in that step of the process in which soap formation is effected as, for example, in the reaction between 12-hydroxystearic acid and calcium hydroxide/calcium carbonate, if incomplete or appreciably incomplete soap formation occurs, somewhat soft greases result. To insure optimum results, complete or essentially complete soap formation should be effected in the carrying out of the process. In those instances in which incomplete soap formation occurs in the process of producing the greases pursuant to our present invention, this may be overcome by the addition of lime followed by the soap-forming aliphatic monocarboxylic or fatty acids, such as 12-hydroxystearic acid, preferably at a temperature of the order of about 280° which stiffens the grease sufficiently to bring the penetration into desired optimum selected specification ranges. This procedure is carried out successfully as is illustrated by the following TABLE II.

TABLE II

Post Reaction with Lime/12-Hydroxystearic Acid

| % Lime | % 12-Hydroxystearic acid | Temp. | Time | Pen. before treatment | Final Pen. |
|---|---|---|---|---|---|
| | | Laboratory Treatment | | | |
| 0.25 | 1.0 | 280° | 1½ hrs. | 308 | 285 |
| | | Plant Treatment | | | |
| 0.25 | 1.0 | 280° | 1½ hrs. | 308 | 286 |

EXAMPLE II

Into a jacketed steam heated grease kettle provided with an internal agitator, there is charged 42.8 parts of an overbased Newtonian calcium sulfonate solution (C-400). To this is added 18.73 parts bright stock oil. Heat is applied to the jacket and, when the temperature reaches 150°, 4.28 parts of water is added, followed by 1.71 parts linear detergent sulfonic acid (a substantially or mainly linear 12 carbon atom monoalkyl benzene). When the temperature reaches 190°, 0.51 parts acetic acid is added and then 1.39 parts methyl cellosolve is added. The batch is then held between 190°–205° during the next hour until thickening has been completed. The product is then dehydrated to 270°. This constitutes Step 1 of this EXAMPLE II of the process whereby an intermediate sulfonate grease is prepared in which the calcium carbonate content, on standing for a short time, is in the form of a colloidal solution comprising extremely finely divided particles of calcite in the form of crystals.

In Step 2, under conditions of mixing or agitation, there is added to 63.75 parts of the product produced by Step 1, 21.24 parts of MCT 30 oil, 1.54 parts of hydrated lime, 2.99 parts of water, and 2.55 parts of boric acid mixed with 10.17 parts of hot water and, after the calcium hydroxide and boric acid have fully reacted, heat is applied to a temperature of about 285°. The reactants are held at this temperature for 1 hour and then 2.88 parts of 12-hydroxystearic acid flakes is added over a period of about 10 minutes. The temperature is maintained at 285° for another hour, whereupon 0.5 parts of an oxidation inhibitor (e.g., PAN), 0.64 parts of a viscosity improver (Acryloid 155-C) and 1.98 parts black oil are charged. A final oil adjustment is made by adding 4.92 parts MCT 30 oil and then the product is run through a colloid mill and drummed off.

Comments

It is not necessary to divide the process into Steps 1 and 2. It is done in this EXAMPLE II only to observe and follow the procedure for producing the intermediate sulfonate grease. In larger scale commercial production, it is generally more desirable to charge the oil, lime and boric acid solution immediately after initial thickening and then the batch is dehydrated to about 285°.

EXAMPLE III (2-Step Process)

Into a reactor equipped to heat to 320°, there is charged 40.5 parts C-400. To this is added 7.37 parts bright oil stock and 7.37 parts MCT 30 Oil. Heat is applied to the jacket and, when the temperature reaches 150°, 4.08 parts of water is added, followed by 1.56 parts of detergent sulfonic acid. When the temperature reaches 190°, 0.49 parts of acetic acid is added, followed by the addition of 1.3 parts methyl cellosolve. Mixing is continued and the batch is held between 190°–205° under reflux conditions. During the next hour, the batch converts to a thickened sulfonate and, when the conversion is completed, a further 16.48 parts bright stock and 16.48 parts MCT 30 oil is added. Then 1.37 parts of lime is added, at a temperature of 180°–190°, and this is followed by the addition of 2.29 parts of boric acid. Heat is then carefully applied and the batch dehydrated to 310°–320°.

After reacting for ½ hour to 1 hour at 310°, a hot mixture of 2.6 parts 12-hydroxystearic acid in 2.6 parts MCT 30 oil is added. After about 1 hour at this temperature, 0.3 parts PAN and 0.67 parts Acryloid-155C is added. Upon cooling to 250°, the batch is milled to yield a non-tacky, grade II sulfonate grease.

EXAMPLE IV (1-Step Process)

|   | Parts |
|---|---|
| 1. Neutral Calcium Sulfonate | 8.46 |
| 2. Oil With Neutral | 8.06 |
| 3. Faxam 22 | 6.77 |
| 4. MCT 30 | 16.36 |
| 5. Detergent RSO$_3$H | 1.81 |
| 6. Lime | 13.78 |
| 7. Heptane | 25.00 |
| 8. Methyl Cellosolve | 5.8 |
| 9. Acetic Acid | 0.48 |
| 10. CO$_2$ | 6.85 |
| 11. Bright Stock Oil | 30.62 |
| 12. Lime | 1.49 |
| 13. Water | 2.99 |
| 14. Boric Acid | 2.50 |
| 15. Water | 10.17 |
| 16. 12-Hydroxystearic acid | 2.82 |
|   | 143.96 |
| Less: | 43.96 |
|   | 100.00 |

Procedure

In a preferred procedure for carrying out the 1-step process, the ingredients 1 to 9 are charged to a reactor and heated to about 130°, then the CO$_2$ is introduced. Towards the end of the carbonation, the reaction mixture thickens, producing a thickened non-Newtonian overbased calcium sulfonate. Once fully carbonated, ingredients 12 to 15 are next added and the reaction mixture heated to about 280°, removing the volatile solvents. At about 280°, ingredient 16 is added and allowed to react for about 1 hour to form the complex.

| Comparatie Data | Ex. IV 1-Step | Ex. III 2-Step |
|---|---|---|
| TBN | 196 | 170-175 |
| Strong Base # | 2.6 | 10-15 |
| AI (Sulf + Carboxy) | 13.1 | 12½-13 |
| Pen. | 285 | 280-290 |
| GM Panel Test | Exc | Exc |
| Hot Plate Stability | Exc | Exc |
| Appearance | Typical | Typical |

EXAMPLE V

| Hobart Batches - Formulation and Test Results | |
|---|---|
| Formulation | Parts |
| Intermediate sulfonate grease (a previously thickened C-400, as shown in step 1 of EXAMPLE II) | 3600 |
| MCT 30 | 1200 |
| Lime | 87.5 |
| Water | 150 |
| Boric Acid | 144 |
| Water | 576 |
| 12-Hydroxystearic Acid | 163 |
| MCT 30 | 463 |
| PAN | 18 |
| Acryloid-155C | 36 |

Five batches are prepared from the above formulation. In a test program performed on these greases, the results are set forth below in TABLE III.

TABLE III

| | |
|---|---|
| Unworked pen. | 270 |
| Worked pen. | 271 |
| 10,000 stroke pen. | 286 |
| 100,000 stroke pen. | 320 |
| Water Work Stability | |
| 10% water | |
| 60 strokes | 265 |
| 10,000 strokes | 260 |
| 50% water addition | |
| 60 strokes | 259 |
| 10,000 strokes | 275 |
| Rust Test | |
| Dist. H$_2$O | 1, 1, 1 |
| Salt H$_2$O | 1, 1, 2 |
| Oxidation Test | 6 lbs/500 hrs |
| Dropping Point | 490° |
| Timken OK Load | 60 lbs |

A number of observations are made in relation to process conditions and compositional considerations and related matters. In this connection, it may be noted that, in addition to the lime or hydrated lime charged during the reaction with the boric acid, there exists a strong base number of 30 parts from the calcium sulfonate greases of our invention. In the EXAMPLES or formulations set forth above, this amounts to approximately a minimum hydrated lime equivalent of about 1.2% in the finished grease.

In this same general connection, at a constant level of boric acid and 12-hydroxystearic acid of 2.4% and 2.7%, respectively, the percentage of added lime (hydrated), when used in the range of from 1.21% through 5.2%, resulted in excellent performance on a hot plate and in the GM panel test. Furthermore, the penetration is approximately proportional to the lime charged and minimum values are obtained at higher percentages of lime. Note, in this connection, the following TABLE IV.

TABLE IV

| Test | % Lime | % 12-OH | % Boric | Pen. | Oven Test | Hot Plate |
|---|---|---|---|---|---|---|
| 1 | 1.21 | 2.7 | 2.4 | 320 | Exc. | Exc. |
| 2 | 1.4 | 2.7 | 2.4 | 318 | Exc. | Exc. |
| 3 | 1.6 | 2.7 | 2.4 | 303 | Exc. | Exc. |
| 4 | 1.9 | 2.7 | 2.4 | 283 | Exc. | Exc. |
| 5 | 2.7 | 2.7 | 2.4 | 273 | Exc. | Exc. |
| 6 | 5.2 | 2.7 | 2.4 | 262 | Exc. | Exc. |

Generally speaking, as noted above, the proportions, by weight of the greases of our invention, of the soap-forming aliphatic monocarboxylic or fatty acids, for example, 12-hydroxystearic acid, may vary from about 1% to about 6%, particularly in the range of about 1.3% to about 5%. The proportions of said soap-forming acids play a role in regard to the high temperature oven performance and the hot plate stability of the greases. At 1.36% of said acids, oven performance and hot plate stability are less than at the 2% level of said acids and, generally speaking, it is most desirable that the said acids be used in proportions not less than about 1.6%. At higher acid levels than about 2%, the aforesaid acids can be incorporated into the grease batch reaction mixture in either solid, for instance, flake form, or melted form. To maintain a 280-290 penetration, it is sometimes in order to add minor proportions of the mineral oil or equivalent other oil, for instance, of the order of about 9%, or somewhat more or less, of such oil, but at intermediate and lower levels, little effect on penetration occurs. Note the tests in the following TABLE V, where levels of boric acid and lime were retained in the same amounts, namely 2.4% and 2.7%, respectively, with the percentage of the 12-hydroxystearic acid being varied.

TABLE V

| Test | % 12-OH | % Boric | % Lime | Pen. | Oven Test | Hot Plate |
|---|---|---|---|---|---|---|
| 7 | 1.36 | 2.4 | 2.7 | 285 | Some Leakage & Darkening | Some Softening & Leakage |
| 8 | 2.0 | 2.4 | 2.7 | 284 | Exc. | Exc. |
| 9 | 2.7 | 2.4 | 2.7 | 273 | Exc. | Exc. |
| 10 | 4.0 | 2.4 | 2.7 | 278 | Exc. | Exc. |
| 11* | 4.9 | 2.4 | 2.7 | 290 | Exc. | Exc. |

*Test No. 11 had ad additional 9.0% oil cut back to maintain a Grade II pen.

As previously noted, the proportions of the boron acid or boric acid used in the reaction are variable within reasonable limits. In the absence of the boron acid or boric acid, or in the absence of adequate minimal proportions of boric acid, and utilizing proportions of the soap-forming aliphatic monocarboxylic acids in the range of 2.7% and 1.4%, respectively, of the 12-hydroxystearic acid and lime, and with the boric acid being variable, the performance of the greases of our invention range from optimum in the GM panel test and in the hot plate test to very poor performance. Indeed, for instance, where the boric acid used is nil, in panels coated with the resulting grease compositions, said compositions harden to a resinous material with considerable leakage; and extensive melting occurs when said grease is placed on a hot plate. Operating in the range of at least about 0.65% and up to about 4.8% boric acid produces Grade II greases with satisfactory penetrations varying only slightly in said range. This is dependent, to a certain extent, on the relative proportions of the 12-hydroxystearic acid and the calcium oxide or calcium hydroxide. In this latter connection, it may be pointed out that using the soap-forming aliphatic monocarboxylic acids, e.g. 12-hydroxystearic acid, at a proportion of 2.7% and a low level of lime, e.g. 1.4%, and varying the upper proportions of boric acid (2.4% to 2.9% to 4.8%), the hot plate performance at the 4.8% boric acid proportion was somewhat inferior, indicating a non-preferred level of about 4.8% boric acid (at said 1.4% of lime). The resulting grease is softer, but this is a result of the small amount of lime charged. It is generally true that, at low lime values (1.2–1.4%) and constant 12-hydroxystearic acid (2.7%), irrespective of the amount of boric acid charged (e.g. nil to 4.8%), a penetration over 300 is found. See, in this connection, the following TABLE VI. Given these guideposts, relative amounts of boric acid and lime or hydrated lime, in connection with given amounts of 12-hydroxystearic acid (or other soap-forming acids), can readily be selected or chosen based upon simple preliminary testing to arrive at optimum proportions to obtain particularly desirable properties in the greases of our present invention.

TABLE VI

| Test | % Boric Acid | % 12-OH | % Lime | Pen. | Oven Test | Hot Plate |
|---|---|---|---|---|---|---|
| 12 | Nil | 2.7 | 2.7 | 323 | Very Poor (Resinous Coating) | Very Poor |
| 13 | 0.65 | 2.7 | 2.7 | 279 | Darkening + Leakage | Good |
| 14 | 1.32 | 2.7 | 2.7 | 264 | Exc. | Exc. |
| 15 | 2.4 | 2.7 | 2.7 | 273 | Exc. | Exc. |
| 16 | 2.9 | 2.7 | 2.7 | 262 | Exc. | Exc. |
| 17 | 2.4 | 2.7 | 1.4 | 318 | Exc. | Exc. |
| 18 | 2.9 | 2.7 | 1.4 | 308 | Exc. | Exc. |
| 19 | 4.8 | 2.7 | 1.4 | 322 | Considerable Darkening but no Leakage | Extensive Softening |

With further regard to the addition of the boron acid or boric acid to the grease reaction mixture, in general it is desirable to mix, in terms of parts by weight used in such reaction mixture, 1 part of boric acid to 4 parts of water, mixing briefly, then adding said mixture to the kettle and allowing the reaction to occur with the lime, the lime being desirably used in the form of a water slurry, conveniently 1 part of lime to 2 parts of water. It is unnecessary that the boron acid or boric acid be completely dissolved in the water when added to the reaction mixture because, during further reaction in the kettle, adequate dispersion is achieved.

Sulfonate Grease Conversion Procedure

As is indicated generally in TABLE I, during the conversion of the Newtonian overbased calcium sulfonate composition (C-400), or other selected Newtonian overbased calcium sulfonate starting material compositions, to a thickened calcium sulfonate composition containing calcium carbonate in the form of colloidally dispersed calcite, the amount of diluent oil plays a role in the nature of the greases which are produced in accordance with our invention. Evaluation of the intermediate overbased calcium sulfonate starting solution should be made. In the case of the illustrative C-400 starting material, tests carried out on a hot plate indicate that ratios of the C-400 to oil of more than 2:1 are desirable, with about 2.5 or more to 1 of oil being preferred. At ratios of 1:1, evaluation of intermediate grease samples on a hot plate display a greater tendency to soften. This is further magnified upon completion of the process and evaluation of finished greases. Again, simple pretesting, where a particular overbased calcium sulfonate starting material is utilized, will enable one readily to determine reasonably optimal proportions of diluent oil which should be present in the starting overbased calcium sulfonate solution starting material.

Reaction Temperatures

A more complete reaction between lime (or hydrated lime) and boron acids, particularly boric acid, is achieved when water is present to dissolve the acid. A satisfactory product is also obtainable by adding the boric acid at high temperatures (as high as about 300°) but, at times, if the neutralization is incomplete, the grease may tend to have a somewhat grainy texture.

It is advantageous to add the fatty acid under essentially anhydrous conditions because appreciable proportions of water, if present, tend to reduce penetration values. Reaction temperatures to effect the formation of the aliphatic monocarboxylic acid soap constituent of the grease compositions of our invention are desirably between 260°-320° but are somewhat variable.

Boric Acid, Lime Neutralization/Dehydration

Depending, in part, on the size of the batches involved, it usually takes about 2½-3 hours to dehydrate to 300°. Foaming tends to occur, but this can be readily controlled by additions of various antifoams as, e.g. DC 200 as a foam inhibitor.

Soap-Forming Aliphatic Monocarboxylic or Fatty Acid Neutralization

This reaction tends to proceed rapidly and is usually completed within an hour or less, depending, in part, on the particular soap-forming aliphatic monocarboxylic or fatty acid utilized. The soap-forming step is conveniently carried out at a temperature of about 260°-320° although this is variable.

Mixing

The grease texture of the finished greases of our invention is affected, to some extent, by the nature of the mixing or agitation of the reacting materials making up the greases. If the mixing or stirring or agitation is slow, the finished grease may be somewhat grainy. If, however, the mixing is rapid or vigorous and, particularly if the boron acid or boric acid is completely or substantially completely dissolved in hot water prior to its addition, or dissolves relatively shortly after its addition to the reacting ingredients, graininess is generally avoided. In any event, any graininess can be easily eliminated by subsequent milling.

The temperature of the reaction at which the grease formation is carried out is desirably in the range of about 260°-320°. At the lower temperatures, sufficient time is provided so as to effect full or essentially full dehydration of the system. At the lower temperatures, in the GM panel test, some slight blistering may occur but raising the temperature tends to overcome or decrease or essentially eliminate any blistering.

Order of Mixing Certain Ingredients

With respect to the order of addition to the reaction mixture of (a) the soap-forming monocarboxylic acid, for instance, 12-hydroxystearic acid or stearic acid or oleic acid, and (b) the lime/boric acid addition, said order of such additions appears to be of no materiality since, in all such cases, an excellent, smooth grease is obtained. Mechanical stability does not appear to be any problem with the greases produced in accordance with our present invention.

In summary, the novel greases of the present invention overcome numbers of objections while retaining many of the desirable properties and advantages of known calcium sulfonate greases. The greases of the present invention, particularly in the especially advantageous embodiments thereof, are characterized by exceptional mechanical stability, high load carrying values, excellent resistance to water, oxidation and corrosion, and outstanding performance in high temperature applications. They are, as stated previously, truly multi-purpose greases which equal and, in many cases, outperform other high temperature greases such as Lithium Complex, Aluminum Complex and Polyurea greases, and they do not contain heavy metals or other harmful or environmentally undesirable additives. Grease compositions made in accordance with our present invention have been found to be especially effective in environments where high load situations exist as, for example, in the case of rock crushers.

In the following TABLE VII, various tests were run utilizing the overall best embodiment of a grease made in accordance with our present invention, as illustrated in the above EXAMPLE 1, and compared with published data respecting commercial so-called premium multi-purpose greases sold on the open market. The aforesaid grease of our present invention is identified, for convenience, in said TABLE VII as Grease No. 1.

TABLE VII
COMPARATIVE PROPERTIES - MULTI-PURPOSE GREASES

| PREMIUM GREASES TYPICAL VALUES | Li Complex | Al Complex | Poly Urea | Grease No. 1 |
|---|---|---|---|---|
| NLGI Grade Pen. @ 25° C. (77° F.) (D217), mm/10 | 2 | 2 | 2 | 2 |
| Worked, 10,000 ×, change from 60 × | +15 | +15 | +15 | −1 |
| Worked, 100,000 × change from 60 × | +30 | +94 | +60 | +2 |
| Dropping Pt. (D566), °F. | 570 | 550 | 463 | 570+ |
| °C. | 299 | 288 | 239 | 300+ |
| Oil Separation (D1742) 24 hrs. @25° C. (77° F.) | 3.1 | 1.2 | 0.8 | 0.2 |
| Water Washout (D1264) @ 79° C. (175° F.) | 3.9 | 7.6 | 0 | 2.7 |
| Bomb Oxidation Stability (D942) psi drop @ 500 h | 8 | 5 | 53 | 2.0 |
| Rust Test Rating (D1743) | 1,1,1 | 3,3,3 | 1,1,1 | 1,1,1 |
| 4 Ball Wear Test (D2266) mm/scar, 40 kg, 1200 rpm, 75° C., 1 h | 0.40 | 0.77 | 0.35 | 0.4 |
| 4 Ball EP Test | | | | |
| (D2596) LWI, kg | 40 | 40 | 80 | 65 |
| Weld Pt., kg | 250 | 315 | 500 | 500 |
| Timken OK Load (D2509), lb | 40 | 40 | 70 | 65 |
| Lubrication Life (D3336) @ 149° C. (300° F.), No. 204 bearing 10,000 rpm, h to failure | 580 | 97 | 420 | 800 |
| Wheel Bearing Leakage grams (D1263) Modified @ 163° C. (325° F.) | 1.5 | 1.8 | 0 | 0.4 |

The following observations are made with respect to various properties of Grease No. 1 and, in certain cases, in connection with test results reported in TABLE VII.

1. Mechanical Stability

The mechanical stability of Grease No. 1 is outstanding. Tests in the ASTM grease worker show no change in consistency after 100,000 strokes or any sign of breakdown in the shell roll. The shell roll (D1832) test was modified from 6 hours at room temperature to 100 hours at 150° F., to increase the severity and, again, no significant softening was observed.

2. Load Carrying Ability

Grease No. 1 has excellent EP properties. Timken values of 65 Lbs. load, LWI of 65 Kg and weld point of 400 kg are typical, while 4 ball wear performance is equally outstanding. (See TABLE VII)

3. Thermal Stability

High temperature performance of Grease No. 1 is excellent in all areas tested, i.e.

(a) Dropping Point—Grease No. 1 does not become fluid at temperatures approaching 600° F. and, after cooling to room temperature, it returns to its original grease structure, unlike Lithium Complex and Polyurea greases.

(b) Wheel Bearing Leakage (D1263)—In this test, modified at 325° F., Grease No. 1 shows no leakage, hardening or other signs of failure and is comparable to other premium greases.

(c) Lubrication Life (D3336)—Grease No. 1 outperforms other premium greases by a considerable margin (TABLE VII). A more severe version—at 325° F.—shows even more impressive results (600 hours).

4. Oxidation Stability

Bomb oxidation stability (D942)—PSI drops of 2 after 500 hours and 9 after 1,000 hours, reflect the excellent resistance of Grease No. 1 to oxidation, again, outperforming other premium greases.

The excellent oxidation stability shows up in the test for lubrication life reported in the thermal stability section.

In an in house test—a modification of GM 9075-D—where panels coated with grease were exposed in an oven @ 300° F. for one week, other premium greases show coking or turn into hard crusty substances whereas Grease No. 1 retains its soft unctuous texture.

5. Resistance to Water (a) Work Stability with Water—In a variation of the ASTM work stability test, Grease No. 1 is mixed with 50% water and after working 100,000 strokes, remains virtually unchanged in consistency in contrast with other premium greases which tend to slum or break down.

(b) Water Resistance—In this test, Grease No. 1 shows excellent adhesion, high water absorption and no sign of breakdown.

(c) Water Washout (D1264)—Grease No. 1 compares favorably to other premium greases (TABLE VII).

6. Corrosion Resistance

Rust Test Rating (D1743)—Grease No. 1 easily passes this test and is equivalent to other premium greases. In a more severe version of this test, modified with synthetic sea water, Grease No. 1 still gives a 1, 1, 1, rating.

7. Low Temperature Performance

While Grease No. 1 is not a low temperature grease, a multi-purpose lubricant should desirably be able to perform over a wide temperature range.

Grease No. 1 performance at low temperatures is very good.

(a) US Steel Mobility Test—This is a measure of pumpability. Grease No. 1 shows good pumpability (US Steel Mobility @ 0° F. 0.12)

(b) Low Temperature Torque (D1478)—Based on performance at −40° F., Grease No. 1 has a starting torque of less than 10,000 G-CM and can be used to −40° F.

8. Operating Temperature Range

Based on low temperature torque test and lubrication life, Grease No. 1 has a normal range from −40° F. to 325° F.

9. Age Hardening

This tendency to harden has often been a problem with prior art Calcium Sulfonate greases in central lubrication systems. Since Grease No. 1 is a Calcium Sulfonate type of grease but specialized and novel, this tendency to harden with age, on testing by soaking Grease No. 1 for an extended period at 250° F., after cooling to room temperature no change in consistency is observed.

We claim:

1. A process of preparing high performance modified overbased calcium sulfonate complex greases, the steps which comprise introducing into or forming in situ, in a non-voltaile oleaginous medium comprising (a) non-Newtonian thickened overbased calcium sulfonate composition having a metal ratio of about 6 to about 30 and containing solid particles of colloidally dispersed crystalline calcite, (b) a product formed from the reaction of a boron acid with a calcium salt to form a calcium borate, (c) a soap formed from the reaction of a calcium compound and a soap-forming aliphatic monocarboxylic acid containing at least 12 carbon atoms, said (a) ingredient constituting from about 30 to about 55%, the boron acid and the calcium salt which together produce said calcium borate being present in proportions to produce from about 1.1 to about 6.7% of a calcium borate, and any calcium hydroxide which may be added to the aliphatic monocarboxylic acid being such as to produce a minor percentage of said soap not less than 1%, the said aliphatic monocarboxylic used in making said (c) soap being a minor percentage not less than 1%, and the balance of said complex greases being substantially a non-volatile oleaginous medium, the aforesaid percentages being by weight of said complex greases.

2. The process of claim 1, in which the boron acid is boric acid.

3. The process of claim 2, in which the aliphatic monocarboxylic acid is 12-hydroxystearic acid.

4. The process of claim 1, in which the (b) and (c) products which are introduced into said non-Newtonian thickened overbased calcium sulfonate composition are hydrated lime, boric acid and 12-hydroxystearic acid.

5. The process of claim 4, in which both the (b) and (c) ingredients are formed in situ in said grease.

6. The process of claim 5, in which the non-volatile oleaginous medium is a mineral oil.

7. The process of claim 6, in which the boron acid is utilized in proportions, by weight of the greases, in the range of about 0.6% to about 3.5%.

8. The process of claim 6, in which any added lime or calcium hydroxide, to form the calcium borate and the calcium soaps of the soap-forming aliphatic monocarboxylic acids, is in the range of about 0% to about 5%.

9. The process of claim 6, in which the soap-forming aliphatic monocarboxylic acid is utilized in proportions, by weight of the greases, in the range of about 1% to about 6%.

10. A process of preparing high performance modified overbased calcium sulfonate complex greases, the steps which comprise:

(1) providing a non-Newtonian mineral oil composition in the form of a grease containing (a) calcium sulfonate having a metal ratio of about 6 to 30 of an oil-soluble sulfonic acid containing at least 12 carbon atoms and containing solid particles of colloidally dispersed calcium carbonate essentially in the form of crystalline solids of calcite, said (a) ingredient constituting up from to about 55%;

(2) admixing therewith from about 1.1 to about 6.7% of a calcium salt of boric acid or forming said salt in the reaction mixture by the addition thereto of boric acid and a calcium compound selected from at least one member of the group consisting of calcium oxide, hydrated calcium hydroxide and calcium carbonate; and (3) adding to the resulting mixture a small proportion of a soap-forming aliphatic monocarboxylic acid having from 12 to 24 carbon atoms to form in said compositions a soap in an amount of about 1 to about 6%, said steps (2) and (3) being carried out in either such order or, alternatively, in the other order.

11. The process of claim 10, in which the soap-forming aliphatic monocarboxylic comprises 12-hydroxystearic acid 12. The process of claim 10, in which the metal ratio of the overbased calcium sulfonate is in the range of about 6 to about 25.

13. A process for preparing high performance modified overbased calcium sulfonate complex greases, by an essentially 1-step procedure, the steps which comprise overbasing a neutral calcium sulfonate in the presence of a non-volatile oleaginous material and a thickener to produce a non-Newtonian overbased calcium sulfonate having a metal ratio of about 6 to about 25 and containing solid particles of colloidally dispersed crystalline calcite resulting from carbonating said overbased calcium sulfonate, said non-Newtonian overbased calcium sulfonate and its contained calcite constituting up from to about 55%, and incorporating into said at least partially thickened, essentially fully carbonated calcium sulfonate solution (a) a product formed from the reaction of a boron acid with a calcium compound to form a calcium borate, and (b) a soap formed from the reaction of a calcium compound and a soap-forming aliphatic monocarboxylic acid containing at least 12 carbon atoms, the boron acid and such calcium compound as may be added which together produce said calcium borate and the soap being present in proportions to produce from about 1.1 to about 6.7% calcium borate and from about 1 to about 6% of said soap, and the balance of said complex greases being substantially the aforesaid non-volatile oleaginous material, the aforesaid percentages being by weight of said complex greases.

14. The process of claim 13, in which the boron acid is boric acid.

15. The process of claim 14, in which the aliphatic monocarboxylic acid is 12-hydroxystearic acid.

16. A high performance high metal ratio overbased calcium sulfonate complex grease which contains dispersed therethrough, in a non-volatile oleaginous medium, colloidal particles of calcium carbonate essentially in the form of crystalline calcite, said grease including, by weight, (a) about 1.1 to about 6.7% calcium borate and (b) from about 1 to about 6% of a calcium soap of a soap-forming aliphatic monocarboxylic acid containing at least 12 carbon atoms, said (a) and (b) ingredients being essentially homogeneously distributed through said calcium complex grease, said overbased calcium sulfonate complex being present in proportions in the range of about 30 to about 55%, and the balance of said complex grease being substantially the aforesaid non-volatile oleaginous medium, the aforesaid percentages being by weight of said complex grease.

17. The grease of claim 16, in which the calcium soap is that of 12-hydroxystearic acid.

18. The grease of claim 16, in which both the (a) and (b) ingredients are formed in situ in said grease.

19. A high performance modified overbased calcium sulfonate complex grease prepared from non-Newtonian overbased calcium sulfonate oleaginous solutions, containing colloidally dispersed solid crystalline particles of calcium carbonate, in a mineral oil vehicle, which are essentially in the form of calcite; said grease containing said non-Newtonian overbased calcium sulfonate and its calcium carbonate constituting up from to about 55%, calcium borate and calcium soaps of soap-forming aliphatic monocarboxylic acids having from 12 to 24 carbon atoms, said overbased calcium sulfonate having a metal ratio of about 6 to 25, the acid calcium borate being present in proportions of about 1.1 to about 6.7%, and the aliphatic monocarboxylic acids which are present as calcium soaps being present in terms of the percentages of the aliphatic monocarboxylic acids used to form said calcium soaps in proportions to form about to about 6% of said soaps; said recited percentages being based upon the weight of the complex grease.

20. The grease of claim 19, in which calcium soap is a calcium soap of $C_{12}$ to $C_{24}$ hydroxy-fatty acid.

* * * * *

UNITED STATES PATENT OFFICE
CERTIFICATE OF CORRECTION

PATENT NO. : 4,560,489
DATED : December 24, 1985
INVENTOR(S) : Ron Muir and William Blokhuis It is certified that error appears in the above-identified patent and that said Letters Patent are hereby corrected as shown below:

Claim 10, Column 23, line 2, the word "from" should be deleted.

Claim 13, Column 23, line 35, the word "from" should be deleted.

Claim 19, Column 24, line 34, the word "from" should be deleted; line 38, the word "acid" should be changed to "said"; line 43, after "about", the numeral "1" should be inserted.

Signed and Sealed this

Eighteenth Day of March 1986

[SEAL]

*Attest:*

DONALD J. QUIGG

*Attesting Officer*     *Commissioner of Patents and Trademarks*